United States Patent [19]

Itoh

[11] Patent Number: 5,531,310

[45] Date of Patent: Jul. 2, 1996

[54] MECHANISM FOR RIGHTING A TIPPED PACKAGE ALONG A CONVEYOR LINE

[75] Inventor: Kosaku Itoh, Buffalo Grove, Ill.

[73] Assignee: Tetra Laval Holdings & Finance S.A., Pully, Switzerland

[21] Appl. No.: 315,402

[22] Filed: Sep. 28, 1994

[51] Int. Cl.[6] ................................................. B65G 47/24
[52] U.S. Cl. ............................................ 198/395; 198/399
[58] Field of Search ..................................... 198/394, 395, 198/398, 399

[56] References Cited

U.S. PATENT DOCUMENTS

| | | | |
|---|---|---|---|
| 2,501,961 | 8/1950 | Paton . | |
| 3,260,363 | 7/1966 | Vukosic | 198/398 |
| 3,308,923 | 3/1967 | Crawford . | |
| 3,356,364 | 12/1967 | Grigereit . | |
| 3,433,966 | 3/1969 | Letch et al. | 198/395 |
| 3,506,840 | 4/1970 | Fink | 198/395 |
| 3,710,922 | 1/1973 | Lanphere et al. | 198/395 |
| 3,724,641 | 4/1973 | Wainwright et al. | 198/395 |
| 3,730,325 | 5/1973 | Goodwin | 198/395 |
| 3,779,542 | 12/1973 | Barker et al. . | |
| 4,029,195 | 6/1977 | Hartness et al. . | |
| 4,838,408 | 6/1989 | Brawn . | |
| 5,074,545 | 12/1991 | Handa . | |
| 5,113,994 | 5/1992 | Mueck . | |

*Primary Examiner*—Joseph E. Valenza
*Attorney, Agent, or Firm*—McAndrews, Held & Malloy, Ltd.; Patrick N. Burkhart

[57] ABSTRACT

A mechanism is set forth that prevents packages from tipping as the packages are moved along a conveyor line. The mechanism employs a at least one gate, a detecting means for detecting when a tipping package has been righted and holding means for holding the gate in a closed position until the detecting means detects a righted package. In one embodiment, the mechanism comprises an upper gate and a lower gate mounted in the path of a moving conveyor belt. The upper gate and lower gate are operatively connected by a camming mechanism which prevents the upper gate from opening under the influence of the upper portion of a package until the lower gate is engaged by the lower portion of the package.

15 Claims, 9 Drawing Sheets

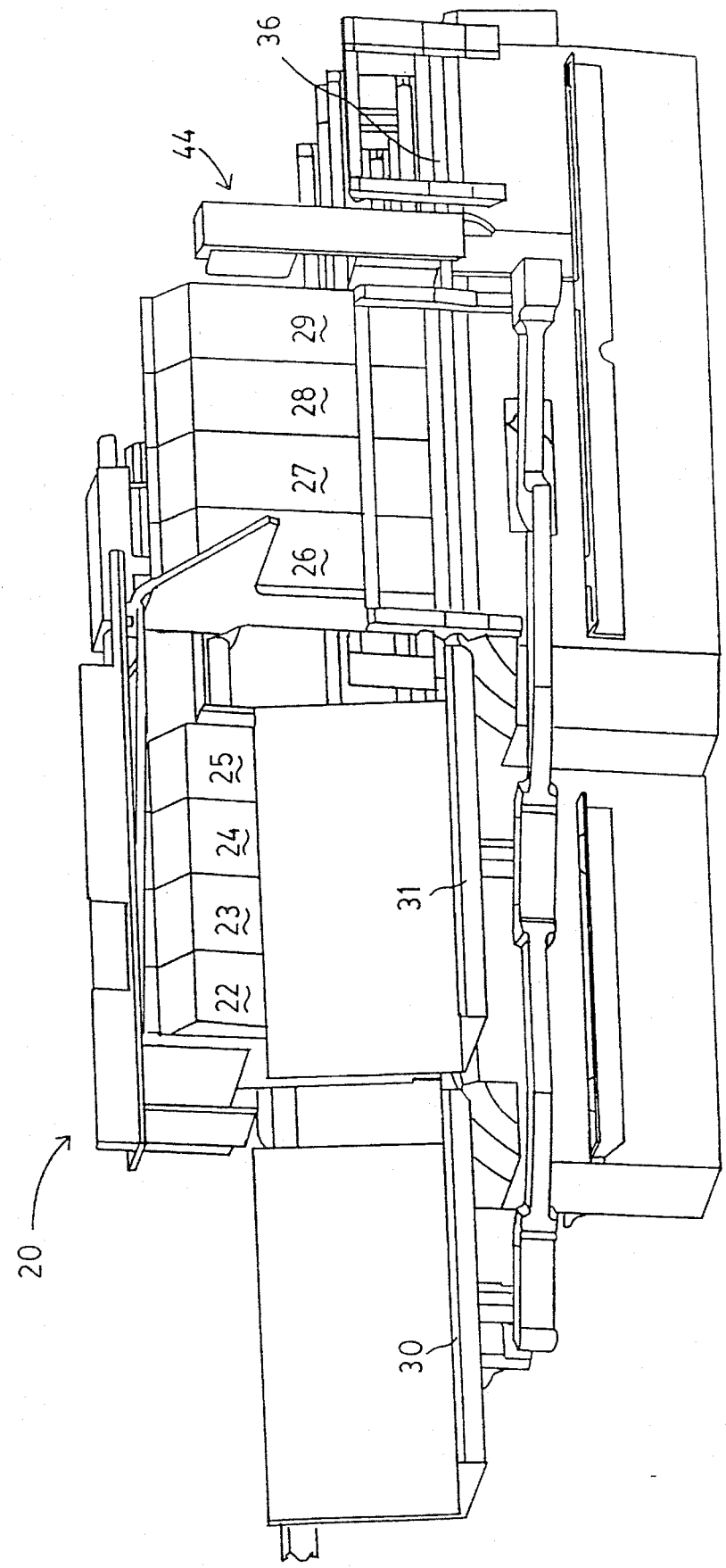

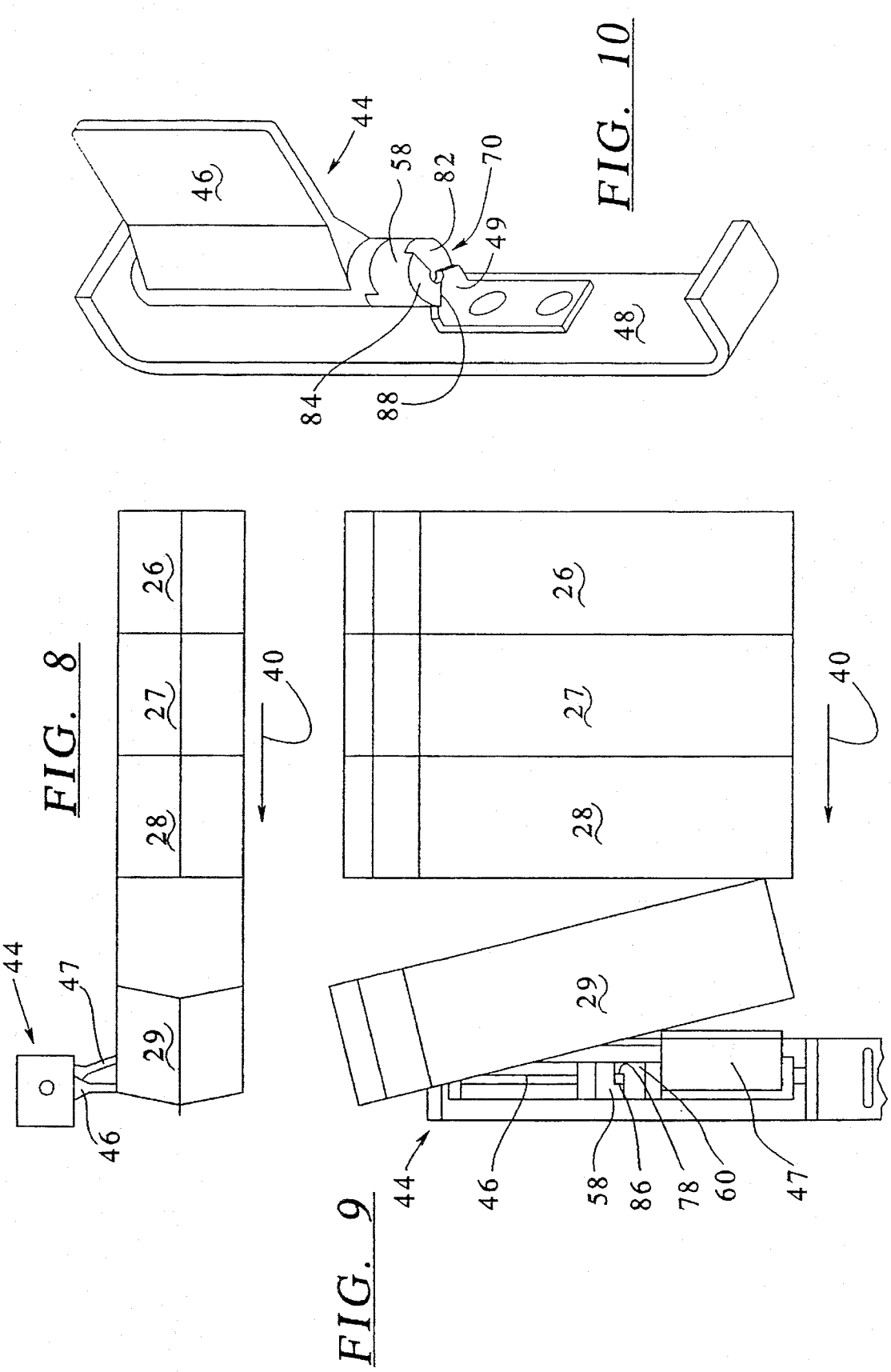

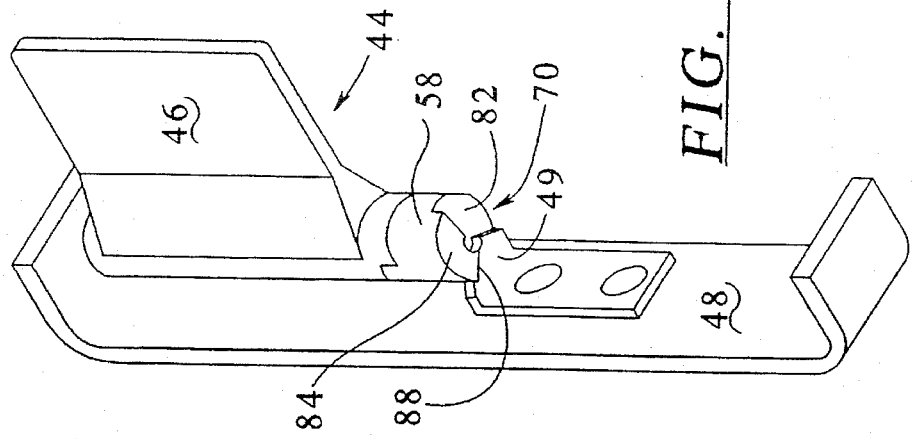
FIG. 13
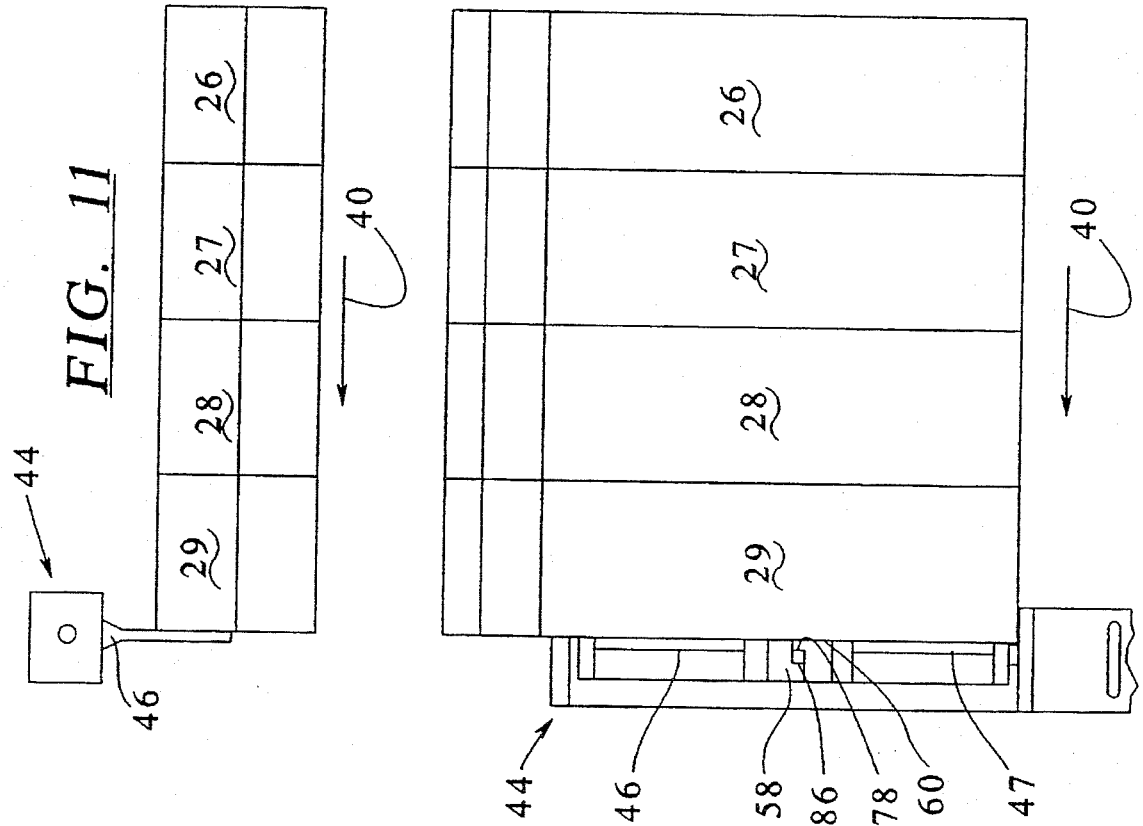
FIG. 11
FIG. 12

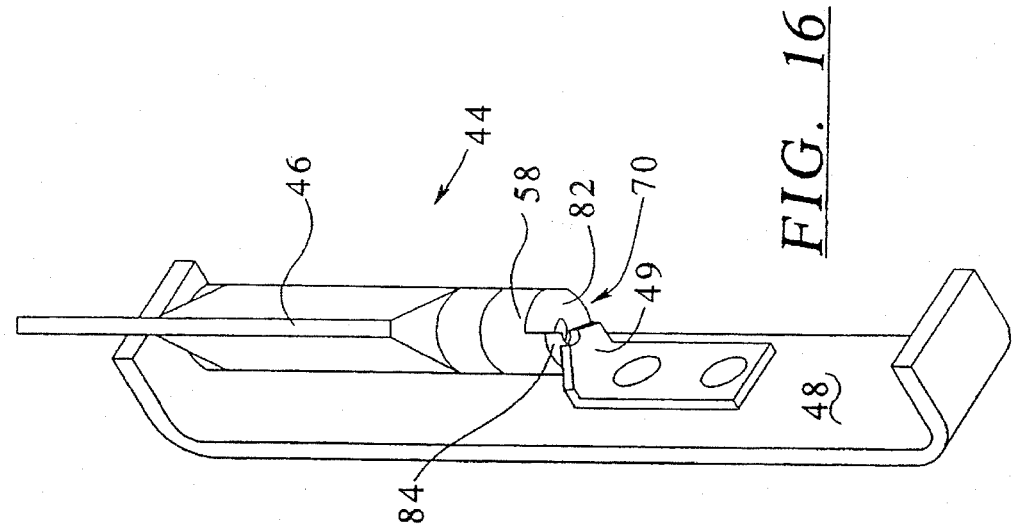
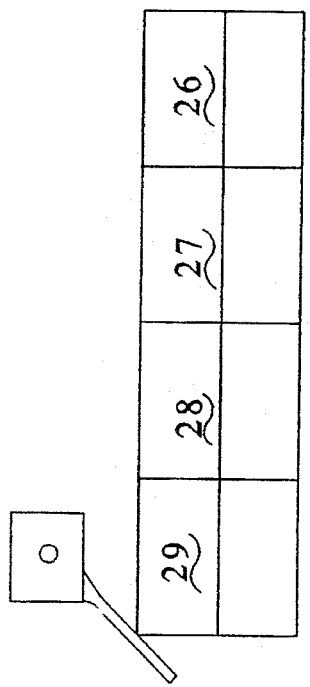
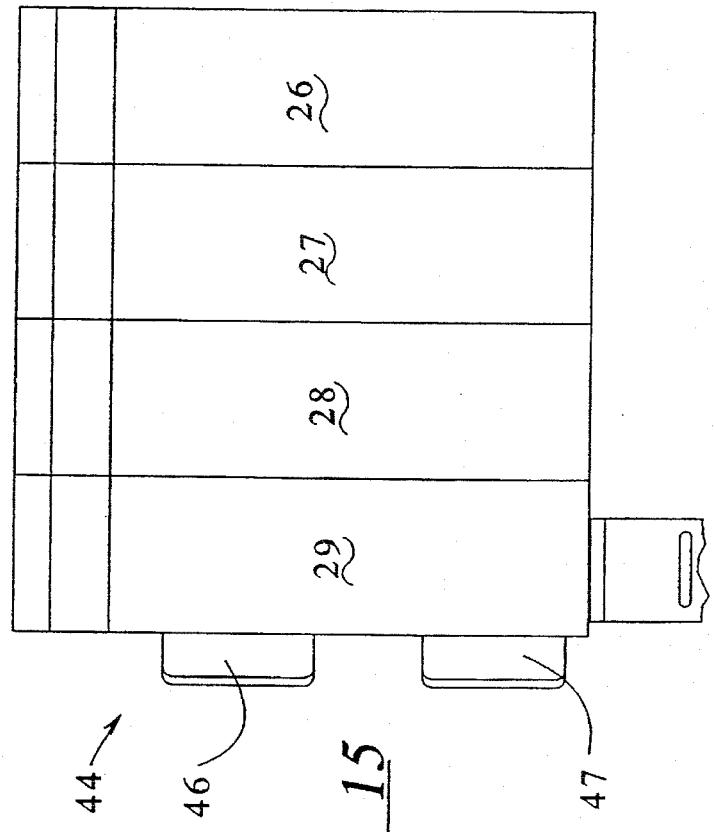
FIG. 14
FIG. 15
FIG. 16

5,531,310

MECHANISM FOR RIGHTING A TIPPED PACKAGE ALONG A CONVEYOR LINE

TECHNICAL FIELD

The present invention relates generally to the conveying of a package along a conveyor. More specifically, the present invention relates to a mechanism for righting a tipped package while the package is being transported along a conveyor line of a packaging machine.

BACKGROUND

Conveyor lines are employed in a variety of industries to move items from place to place where work is performed on them. By way of example, package forming and filling machines may discharge filled packages to numerous feet of conveyor lines which transport the packages to distribution equipment.

At specific points along the conveyor line the containers may be subject to sudden changes in speed, bumps or downward slopes as the container is transferred between conveyor belts or from a work station to a conveyor belt. This may cause the containers to tip over or fall against an adjacent container on the line. Any tipping of the containers on the conveyor line can cause product loss, equipment damage, and costly downtime in production. All of these losses tend to increase production costs.

Conveyor line equipment manufacturers have attempted to solve the problem of packages which are rotationally misaligned on a conveyor belt. One such conveyor alignment mechanism is described in U.S. Pat. No. 5,113,994. Another alignment mechanism is described in U.S. Pat. No. 4,838,408. These systems may be effective as to rotationally misaligned packages but they do not solve the problem of tipping packages. These systems may even increase the possibility of packages tipping since they engage the lower leading portion of a moving package thereby causing a package with a higher center of gravity to tip over.

There are existing systems which will detect a fallen package. Rather than attempting to right the package, however, the package is ejected from the conveyor line. This type of system is both wasteful and inefficient. A mechanism which will right tipped packages has not, to this point, been disclosed.

SUMMARY OF THE INVENTION

A mechanism is set forth that overcomes the above mentioned shortcomings of the prior art by righting tipped packages as the packages are moved along a conveyor line. The mechanism employs at least one gate, a detecting mechanism for detecting when a tipping package has been righted, and a holding mechanism means for holding the gate in a closed position until the detecting mechanism detects a righted package. In one embodiment, the mechanism comprises an upper gate and a lower gate mounted in the path of a moving conveyor belt. The upper gate and lower gate are operatively connected by a camming mechanism which prevents the upper gate from opening under the influence of the upper portion of a package until the lower gate is engaged by the lower portion of the package.

BRIEF DESCRIPTION OF DRAWINGS

FIG. 7 is a still further perspective view of the outfeed portion of a package forming and filling machine including a pair of single file conveyors each with the tip righting mechanism of FIG. 4.

FIG. 8 is a top view of the tip righting mechanism of FIG. 4 in engagement with a tipping package.

FIG. 9 is a side view of the tip righting mechanism of FIG. 4 in engagement with a tipping package.

FIG. 10 is a perspective view of the tip righting mechanism of FIG. 4 in a partially assembled state illustrating the relationship between the upper cam and cam stopper when the mechanism is in the position shown in FIG. 9.

FIG. 11 is a top view of the tip righting mechanism of FIG. 4 in engagement with an upright package.

FIG. 12 is a side view of the tip righting mechanism of FIG. 4 in engagement with an upright package.

FIG. 13 is a perspective view of the tip righting mechanism of FIG. 4 in a partially assembled state illustrating the relationship between the upper cam and cam stopper when the mechanism is in the position shown in FIG. 12.

FIG. 14 is a top view of the tip righting mechanism of FIG. 4 in engagement with an upright package as it passes through the tip righting mechanism.

FIG. 15 is a side view of the tip righting mechanism of FIG. 4 in engagement with an upright package as it passes through the tip righting mechanism package.

FIG. 16 is a perspective view of the tip righting mechanism of FIG. 4 in a partially assembled state illustrating the relationship between the upper cam and cam stopper when the mechanism is in the position shown in FIG. 15.

DETAILED DESCRIPTION OF THE PREFERRED EMBODIMENT

Figure 1:
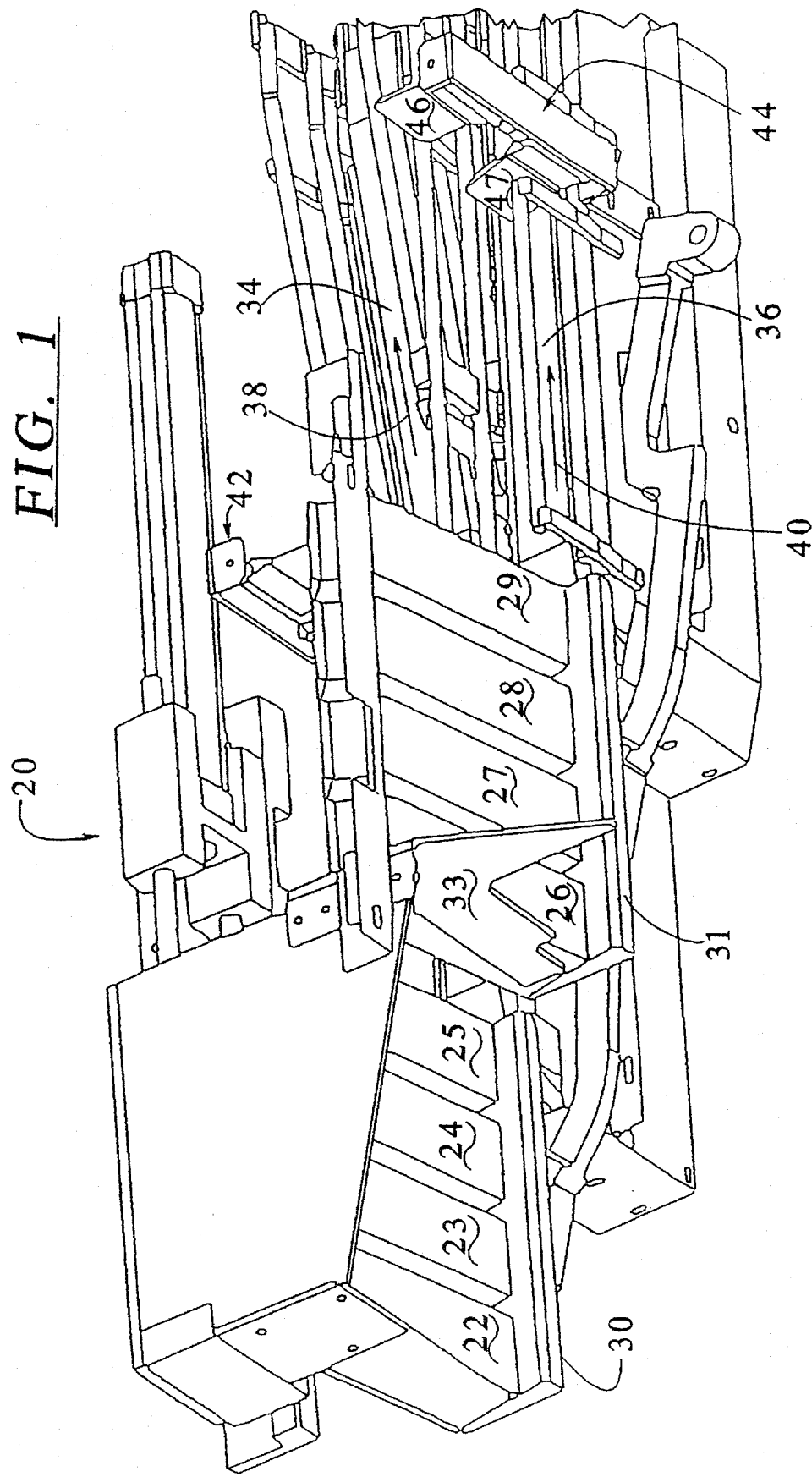
FIG. 1 is a perspective view of the outfeed portion of a package forming and filling machine including a pair of single file conveyors each with a tip righting mechanism.

FIG. 1 is a perspective view illustrating an outfeed mechanism 20 of a package forming and filling machine. The outfeed mechanism can be constructed in the manner described in U.S. Ser. No. 08/315,409, entitled Apparatus For Transferring Containers To A Moving Conveyor and U.S. Ser. No. 08/315,404, also entitled Apparatus For Transferring Containers To A Moving Conveyor which are filed on an even date herewith. Filled and sealed packages 22, 23, 24, 25, 26, 27, 28, and 29, sit on catcher plates 30 and 31 ready to be ejected by a pair of push plates 32 and 33 (only one illustrated) onto a pair of single file conveyor lines 34 and 36. The direction of movement of conveyor lines 34 and 36 and push plates 32 and 33 is indicated by arrows 38 and 40, respectively. A left handed tip righting mechanism 42 is mounted to outfeed conveyor line 34 and a right handed tip righting mechanism 44 is mounted to conveyor line 36. The right handed tip righting mechanism 44 has an upper gate 46 and a lower gate 47 made of, for example, UMHW (ultra high molecular weight polyethylene).

Figure 2:
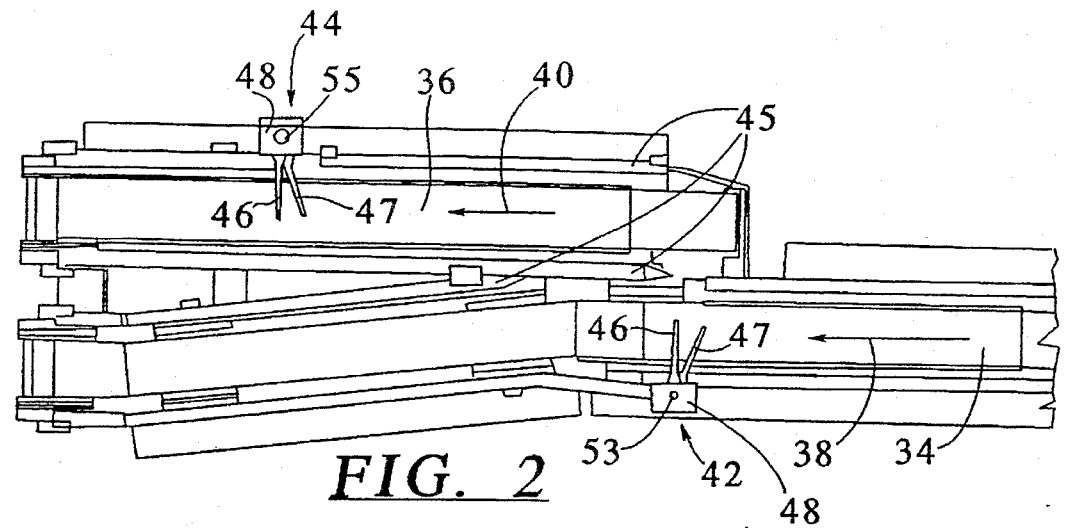
FIG. 2 is a top view of the outfeed portion of the package forming and filling machine of FIG. 1
Figure 3:
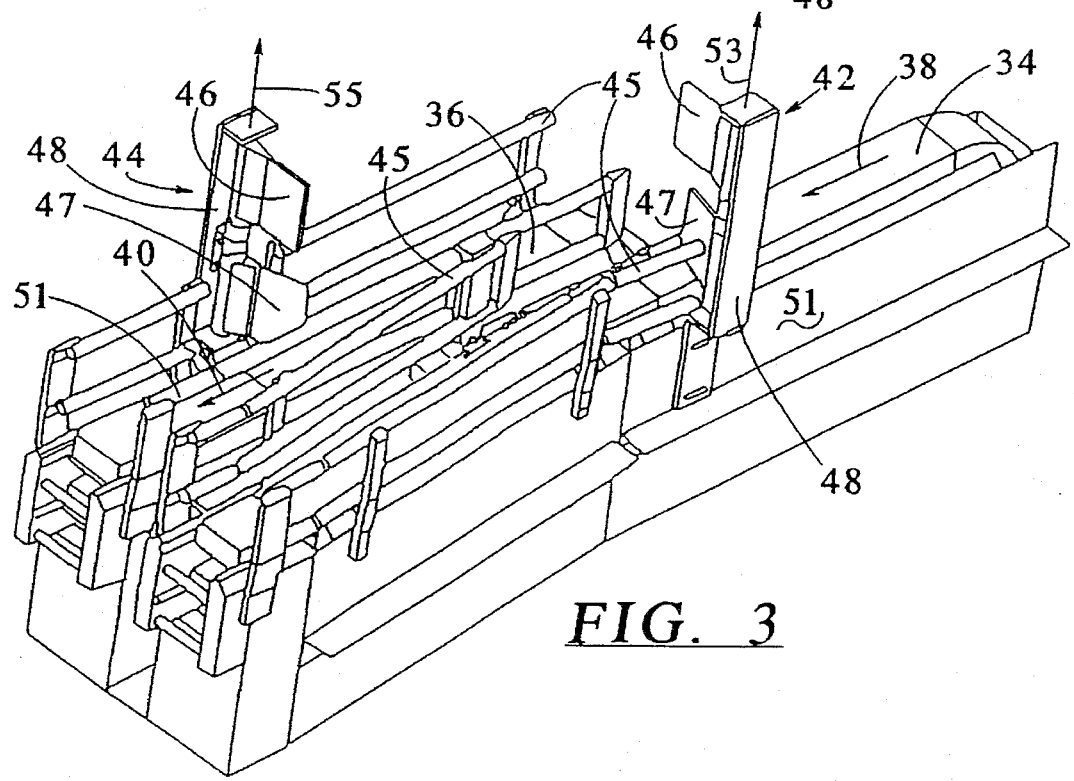
FIG. 3 is a further perspective view of the outfeed portion of the machine of FIG. 1.

FIGS. 2 and 3 illustrate the relative orientation between the tip righting mechanisms 42 and 44 and the respective conveyors 34 and 36. As illustrated, the right hand tip righting mechanism 44 is disposed at an exterior side of the conveyor 36 while the left hand tip righting mechanism 42 is disposed at an exterior side of the conveyor 34. Rails 45 are disposed alongside each of the conveyors 34 and 36 to prevent undesired lateral movement and/or tipping of the packages. The tip righting mechanisms 42 and 44 are likewise suitable for use with other conveyor arrangements.

Each of the tip righting mechanisms 42 and 44 is connected at the respective side of the conveyor by a hinge plate 48. Each hinge plate 48 is secured to a side plate 51 adjacent the respective conveyor.

The upper and lower gates 46 and 47 are secured to the hinge plates 48 for rotational movement about axes 53 and 55 and are illustrated in their closed positions. In their closed positions, the lower gates 47 of each of the tip righting mechanisms 42 and 44 extend over and are angled toward the direction of movement 38 and 40 of the respective conveyors 34 and 36. Likewise, while in their closed positions, the upper gates 46 of each of the tip righting mechanisms 42 and 44 overlie the respective conveyors 34 and 36 but are disposed generally perpendicularly to the direction of movement of the conveyors 34 ad 36.

Figure 4:
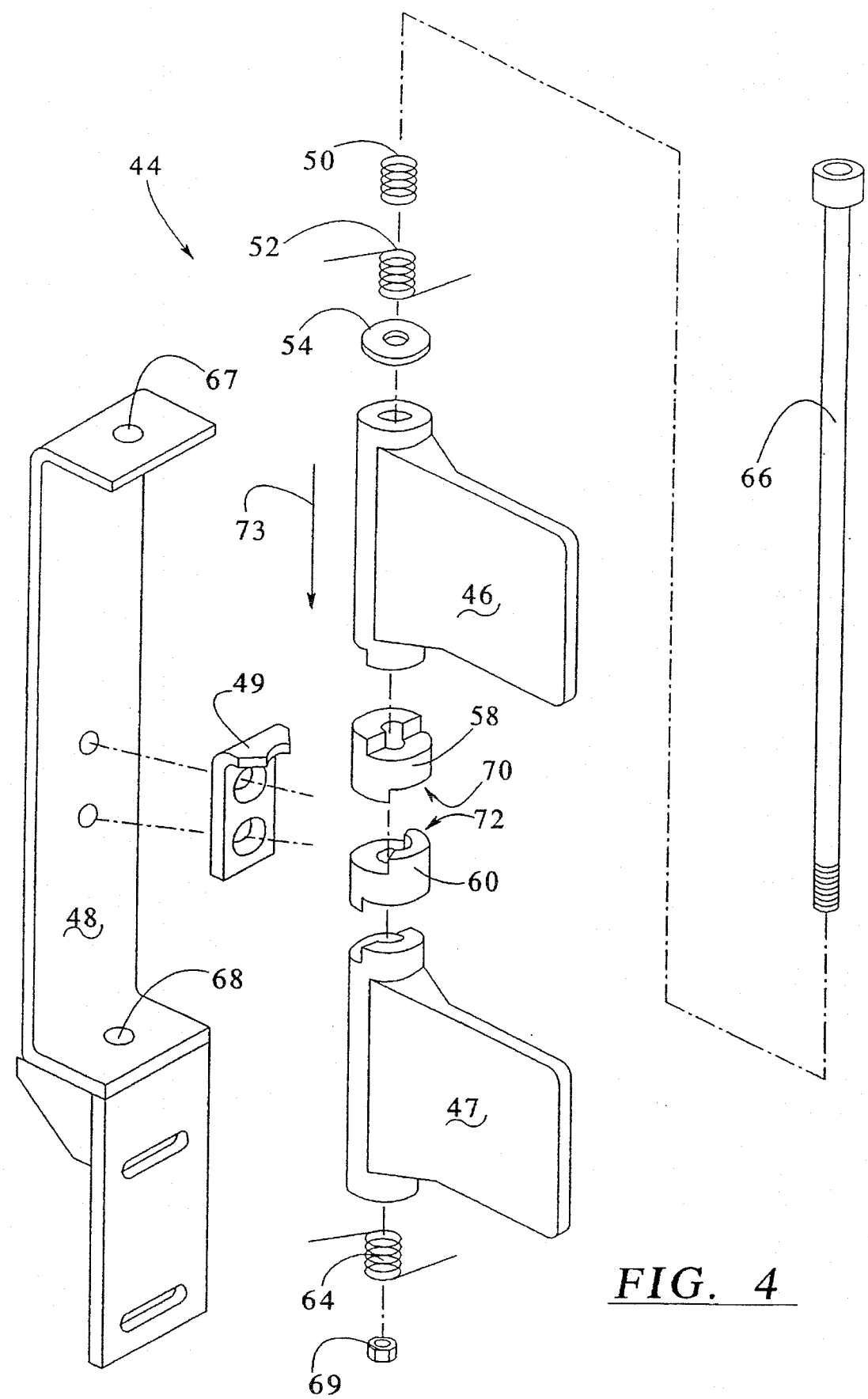
FIG. 4 is an exploded view of one embodiment of a tip preventing mechanism.

FIG. 4 is an exploded view of a right handed tip righting mechanism generally indicated at 44. As previously noted, the tip righting mechanism 44 is mounted to a conveyor line (not shown) by hinge plate 48. A cam stopper 49 is secured, for example, with bolts, to the hinge plate 48. An axial spring 50, rotational spring 52, washer 54, upper gate 46, upper cam 58, lower cam 60, lower gate 47, and rotational spring 54 are disposed about a hinge pin 66 which extends through apertures 67 and 68 and is secured within the hinge plate 48 by the hinge pin 66 and a nut 69. The cam stopper 49 is disposed between the upper cam 58 and the lower cam 60. The camming surfaces of the upper cam 58 and the lower cam 60, generally indicated at 70 and 72, respectively, are shown in more detail in FIG. 5 and FIG. 6.

The upper gate 46 and upper cam 58 are engaged with one another for co-rotation about the hinge pin 66. Likewise, the lower gate 47 and lower cam 60 are engaged with one another for co-rotation about the hinge pin 66. The upper cam 58 and lower cam 60 are made of, for example, stainless steel. The rotational spring 52 is disposed between the upper gate 46 and the hinge plate 48 and biases the upper gate 46 and upper cam 58 in a counter-clockwise direction about the hinge pin 66. The lower cam 60 and lower gate 47 are biased in a counter-clockwise direction about the hinge pin 66 in the same manner by rotational spring 64.

The upper gate 46 is prevented from rotating counter-clockwise beyond its closed position illustrated in FIGS. 1–3 by a stop member 90 (shown in FIG. 6) which is connected to upper cam 58. The stop member 90 (shown in FIG. 6) contacts the hinge plate 48 when the upper gate 46 has rotated to its closed position. The lower gate 47 is prevented from rotating counter-clockwise beyond its closed position by engagement between the lower cam 60 and the cam stopper 49.

In addition to being able to rotate about the hinge pin 66, the upper gate 46 and upper cam 58 can slide axially along the hinge pin 66. The axial spring 50 is mounted about the hinge pin 66 between the washer 54 and a first end of the hinge plate 48. This biases the upper gate 46 in the direction of arrow 73, forcing the camming surface 70 of the upper cam 58 against the cam stopper 49 and the camming surface 72 of the lower cam 60.

With the gates 46 and 47 in the closed position illustrated in FIGS. 1–3, the camming surfaces 70 and 72 of the cams 58 and 60 are engaged such that the upper cam 58 and upper gate 46 are prevented from rotating in a clockwise direction to an open position. Rotation of the lower gate 47 and lower cam 60 in a clockwise direction about the hinge pin 66 results in a disengagement between the upper cam 58 and cam stopper 49 thereby allowing the upper gate 46 and upper cam 58 to rotate about the hinge pin 66 in a clockwise direction.

Figure 5:
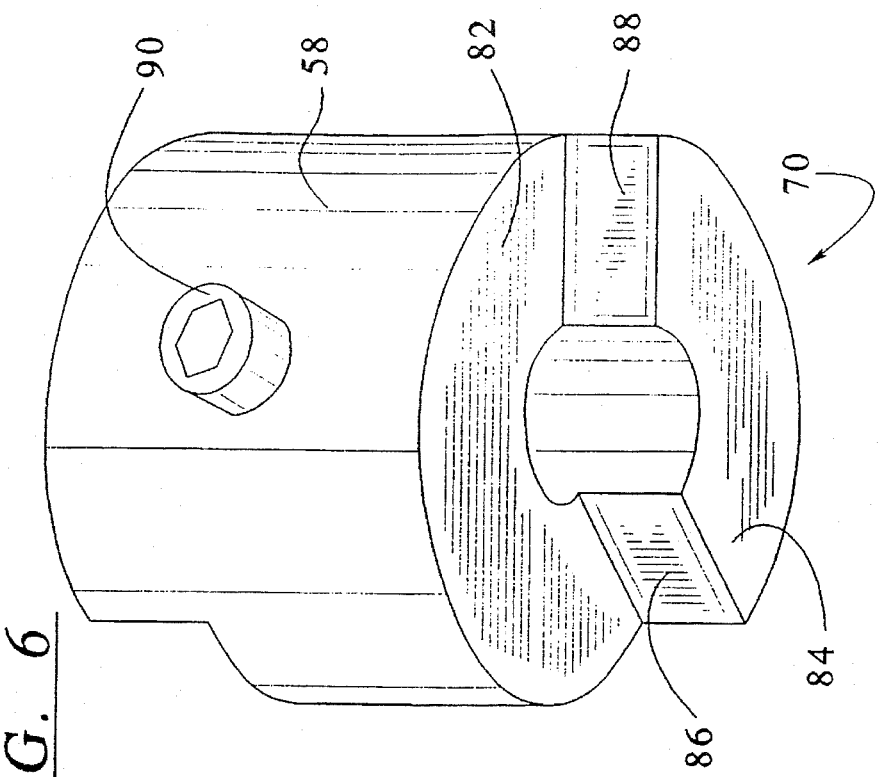
FIG. 5 is a perspective view of a lower cam of the tip righting mechanism of FIG. 4.

In FIG. 5 the lower cam 60 is shown from a top perspective view with the camming surface 72 exposed. The camming surface 72 has a flat portion 74 swept through an arc of about 220 degrees and an extended portion 76 swept through an arc of about 140 degrees. The extended portion 76 includes a sloped surface 78 and a vertical ridge 80.

Figure 6:
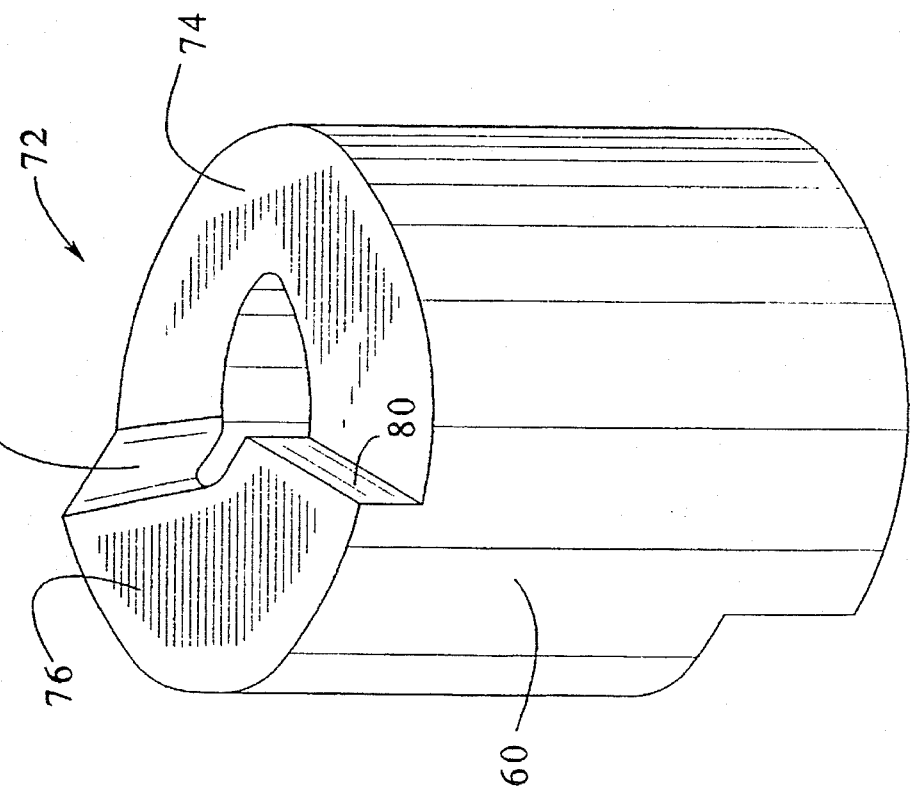
FIG. 6 is a perspective view of an upper cam of the a tip righting mechanism of FIG. 4.

In FIG. 6 the upper cam 58 is shown from a bottom perspective view with the camming surface 70 exposed. The camming surface 70 has a flat portion 82 swept through an arc of about 240 degrees and an extended portion 84 swept through an arc of about 120 degrees. The extended portion 84 includes a first vertical ridge 86 and a second vertical ridge 88.

By viewing FIG. 5 and FIG. 6 together, a better understanding of the interaction between the camming surface 70 of the upper cam 58, the camming surface 72 of the lower cam 60, and the cam stopper 49 can be reached. The vertical ridge 80 of the lower cam 60 engages the cam stopper 49 when the lower gate 47 is in the closed position.

When the upper gate 46 is in the closed position, the second vertical ridge 88 of the upper cam 58 engages the cam stopper 49, the stop member 90 engages the hinge plate 48 (shown in FIG. 4), the flat portion 82 rests partially on the cam stopper 49 and partially on the extended portion 76 of the lower cam 60, and the extended portion 84 of the upper cam 58 rests on the flat portion 74 of the lower cam 60. Also in this position, the first vertical ridge 86 of the upper cam 58 is in contact with the bottom of the sloped surface 78 of the lower cam 60. As the lower cam 60 is rotated clockwise, the first vertical ridge 86 ramps up the sloped surface 78 which forces the upper cam 58 to move upward. When the second vertical ridge 88 has moved above and out of engagement with the cam stopper 49, the upper cam 58 is free to rotate clockwise out of its closed position.

FIG. 7 once again shows the outfeed of a package forming and filling machine generally designated by the number 20. The filled and sealed packages 22, 23, 24, 25, 26, 27, 28, and 29, have been ejected from catcher plates 30 and 31 onto the single file conveyor lines 34 and 36. The packages 26, 27, 28, and particularly the front package 29, which are shown approaching the right handed tip righting mechanism 44 mounted to the conveyor line 36, are prone to tip forward as they are ejected. The following sequence of figures illustrate how the tip righting mechanism 44 operates to right the tipping packages.

FIGS. 8–10 show the state of the various parts of the tip righting mechanism 44 when a moving package 29 has tipped against the upper gate 46. FIG. 8 and FIG. 9 show the packages 26, 27, 28, and 29 as they reach the tip righting mechanism 44. The front package 29 has tipped forward and is being partially supported by the upper gate 46.

FIG. 8 shows the relative offset of the lower gate 47 with respect to the upper gate 46 when they are in their respective closed positions. The upper gate 46 is generally normal to the direction of movement, indicated by the arrow 40 of the packages 26, 27, 28, and 29.

FIG. 9 shows the upper part of the tipping package 29 in contact with the upper gate 46 while the lower portion of the tipping package 29 has not yet come into contact with the lower gate 47. At this point the upper gate 46 and upper cam 58 are not free to rotate because they are in their down or locked position. The first vertical ridge 86 of the upper cam 58 is in contact with the bottom of the sloped surface 78 of the lower cam 60.

FIG. 10 shows the tip righting mechanism 44 with the lower cam 60, lower gate 47, and hinge pin 66 removed so the orientation of the camming surface 70 of the upper cam 58 with respect to the cam stopper 49 can be seen. Here the upper gate 46 and upper cam 58 are in their down or locked position. The engagement of the second vertical ridge 88 of the upper cam 58 with the cam stopper 49 prevents the upper gate 46 from opening. The flat portion 82 of the upper cam 58 is resting partially on the cam stopper 49.

FIGS. 11–13 show the state of the various parts of the tip righting mechanism 44 when the front package 29 has been righted and is in contact with both the upper gate 46 and lower gate 47.

In FIG. 11 the lower gate 47 cannot be seen because it has rotated to a position generally parallel to the upper gate 46. The upper gate 46 is still in its closed position normal to the direction of movement 40 of the packages 26, 27, 28, and 29.

FIG. 12 shows the upper part of the tipping package 29 in contact with the upper gate 46 while the lower portion of the tipping package 29 has engaged the lower gate 47. The lower gate 47 and lower cam 60 have rotated clockwise under the influence of the package 29. At this point the upper gate 46 and upper cam 58 are free to rotate because they are in a separated or unlocked position. The first vertical ridge 86 of the upper cam 58 has moved up the sloped surface 78 of the lower cam 60.

FIG. 13 shows the tip righting mechanism 44 with the lower cam 60, lower gate 47, and hinge pin 66 removed so the orientation of the camming surface 70 of the upper cam 58 with respect to the cam stopper 49 can be seen. Here the upper gate 46 and upper cam 58 are in their up or unlocked position. The second vertical ridge 88 of the upper cam 58 is no longer in engagement with the cam stopper 49 so the upper gate 46 is free to open. The flat portion 82 of the upper cam 58 is no longer resting on the cam stopper 49.

FIGS. 14–16 show the state of the various parts of the tip righting mechanism 44 when the righted front package 29 begins to move through the upper gate 46 and lower gate 47. The gates 46 and 47 will remain open until the packages 26, 27, 28, and 29 have passed through.

FIG. 16 shows the tip righting mechanism 44 with the lower cam 60, lower gate 47, and hinge pin 66 removed so the orientation of the camming surface 70 of the upper cam 58 with respect to the cam stopper 49 can be seen. Here the upper gate 46 and upper cam 58 are in their up or unlocked position and have rotated so that the extended portion 84 of the camming surface 70 is rotating upon the cam stopper 49.

Figure 17:
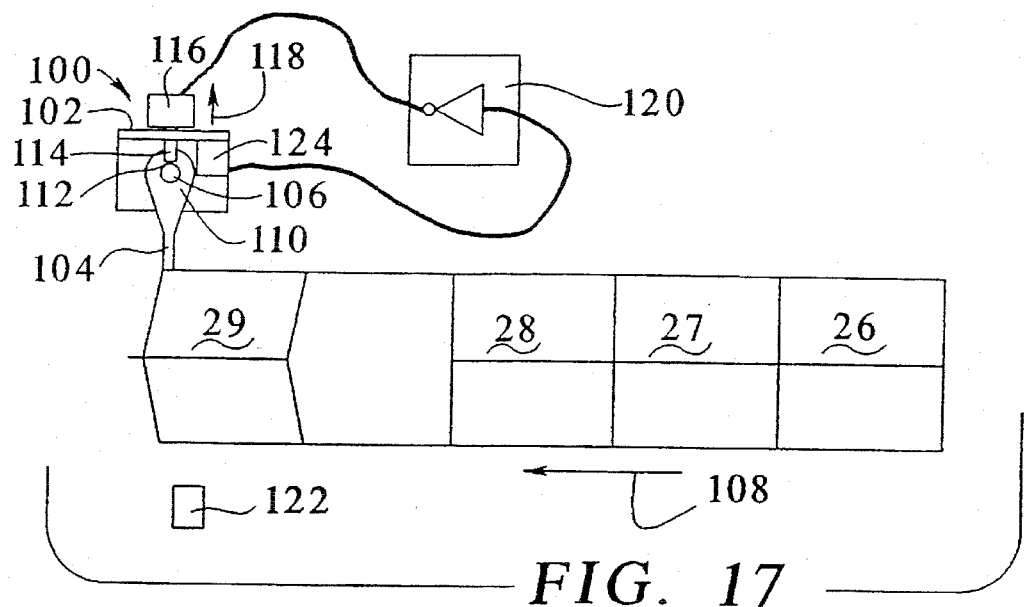
FIG. 17 is a side view of a further embodiment of a tip righting mechanism in engagement with a tipping package.
Figure 18:
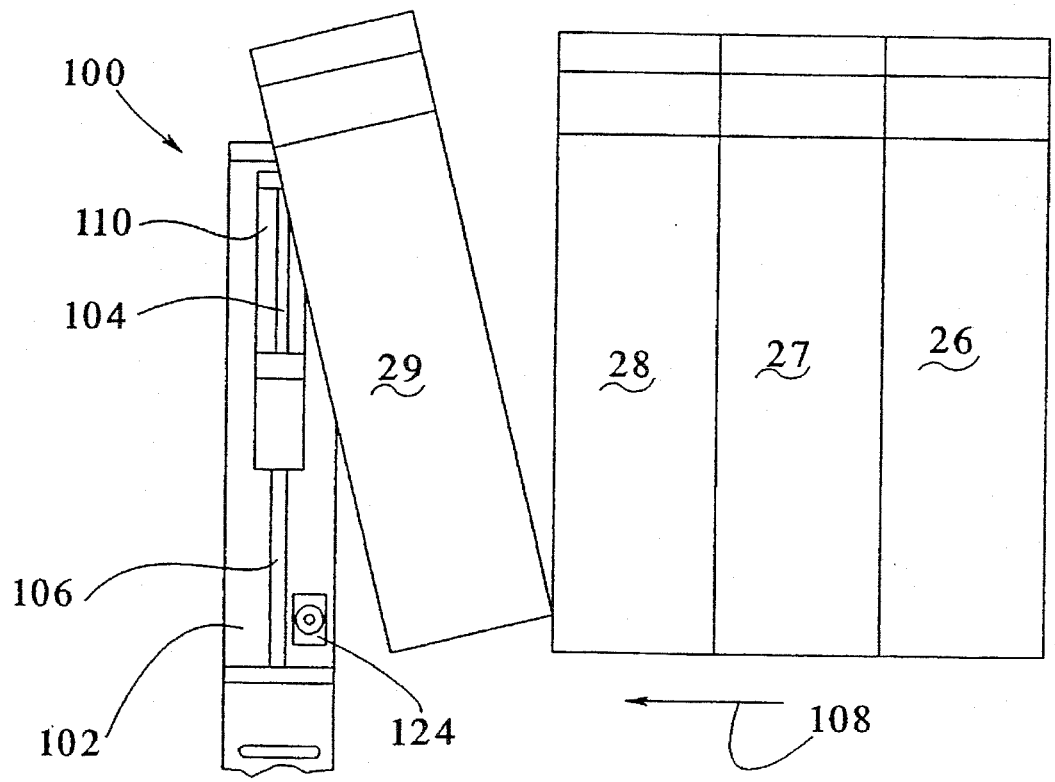
FIG. 18 is a side view of the tip righting mechanism of FIG. 17 in engagement with a package.

FIGS. 17 and 18 are a top view and a side view of a further embodiment of a tip righting mechanism, shown generally at 100. In this embodiment, as above, the tip righting mechanisms 100 is connected to the side of the conveyor (see FIGS. 1–3) by a hinge plate 102. Each hinge plate 102 is secured to a side plate (see FIGS. 2 and 3) adjacent the conveyor.

A single gate 104 is secured by a hinge pin 106 to the hinge plate 102 for rotational movement and is illustrated in its closed positions. In the closed position, the gate 104 of the tip righting mechanism 100 extends over the conveyor and is disposed generally perpendicularly to the direction of movement 108 of the conveyor and packages 26, 27, 28, and 29.

In FIG. 17 the upper portion (shown as 103 in FIG. 19) of the hinge plate 102 has been removed to reveal the hinge portion 110 of the gate 104. A channel 112 runs the length of the hinge portion 110 of the gate 104. While the gate 104 is in its closed position, a rod 114 from a linear actuator 116 engages the channel 112 thereby righting the gate 104 from opening under the influence of a tipping package 29.

The rod 114 from the linear actuator 116 can be disengaged from the channel 112 by linear movement in the direction indicated by the arrow 118. Such disengagement occurs when a signal representing the detection of the lower portion of the package 29 is received by the linear actuator 116 from, for example, a NOT logic gate 120 or a PLC. Detection of the lower portion of the package 29 is achieved by an infrared beam emitter 122 which is mounted to the side of the conveyor line opposite the hinge plate 102 and a receiver 124 which is connected to the hinge plate 102 and electrically coupled to the NOT logic gate 120. The infrared beam is directed from the emitter 122 to the receiver 124 in a direction generally perpendicular to the direction of movement 108 of the conveyor. The infrared beam is positioned towards the direction of movement 108 from the gate 104 and above the conveyor line (not shown) so detection of the package 29 occurs when the package 29 has been righted.

When the packages 26, 27, 28, and 29 have passed the gate 104, the gate 104 will return to its closed position under the influence of, for example, a biasing spring (not shown). At this point the rod 114 from the linear actuator 116 will reengage the channel 112 in the hinge portion 110 of the gate 104.

Although the present invention has been described with reference to a specific embodiment, those of skill in the art will recognize that changes may be made thereto without departing form the scope may be made thereto without departing from the scope and spirit of the invention as set forth in the appended claims.

I claim as my invention:

1. A mechanism for righting a tipped package on a conveyor line, the mechanism comprising:

a) a first gate in fixed positional alignment with the conveyor and disposed for rotational movement about a first axis;

b) a second gate in fixed positional alignment with the conveyor and disposed for rotational movement about a second axis; and c) interconnecting means for interconnecting the first and second gates to prevent opening of said first gate until the package has operatively engaged the second gate, a tipped package engaging the first gate prior to operative engagement of the second gate, operative engagement of the package with the second gate being indicative of an erect package.

2. A mechanism as claimed in claim 1 wherein the first and second axes are a single hinge axis.

3. A mechanism as claimed in claim 2 wherein the interconnecting means comprises:

a) a first cam disposed for co-rotation with the first gate about the hinge axis, the first cam being slidable along the hinge axis from a first position to a second position, the first cam having a first camming surface;

b) a second cam disposed for co-rotation with the second gate about the hinge axis, the second cam having a second camming surface engaging the first camming surface of the first cam; and c) a cam stopper disposed for engagement with the first cam when the first cam is in the first position, rotation of the second gate toward an open position upon engagement with the package causing a relative rotation between the first and second cams, the first and second camming surfaces being shaped relative to one another to cause the first cam to slide to the second position, the first cam being disengaged from the cam stopper while in the second position thereby allowing the first gate to rotate to an open position upon engagement with the package.

4. A mechanism for righting a tipped package on a conveyor line, the mechanism comprising:

a) a hinge pin disposed in fixed positional alignment with the conveyor along an axis substantially perpendicular to the plane of the conveyor line;

b) a lower gate rotatably mounted to the hinge pin;

c) an upper gate rotatably and slidably mounted to the hinge pin;

d) a camming mechanism operably connecting the upper gate to the lower gate which is adapted to hold the upper gate in a closed position until the package operates the lower gate;

d) a first biasing means for rotationally biasing the upper gate into a closed position; and e) a second biasing means for rotationally biasing the lower gate into a closed position;

f) the upper gate being oriented to contact and right a tipped package prior to operative engagement between the tipped package and the lower gate.

5. A mechanism as claimed in claim 4 wherein the hinge pin is connected to a hinge plate.

6. A mechanism as claimed in claim 5 wherein the first biasing means comprises a spring connected between the hinge plate and the upper gate.

7. A mechanism as claimed in claim 5 wherein the second biasing means comprises a spring connected between the hinge plate and the lower gate.

8. A mechanism as defined in claim 4 wherein the camming mechanism comprises:

a) an upper cam connected to the upper gate being adapted to slide along the hinge pin between a first and second axial position, the upper cam having a first camming surface;

b) a lower cam connected to the lower gate in a fixed axial position on the hinge pin, the lower cam having a second camming surface which is in contact with the first camming surface;

c) the first and second camming surfaces being of such relative shape as to cause the first cam to slide to the second axial position upon relative rotation of the first and second camming surfaces; and d) a cam stopper mounted adjacent to the first and second camming surfaces and adapted to engage the first camming surface when the upper cam is in the first axial position.

9. A mechanism as claimed in claim 8 further comprising a third biasing means for axially biasing the upper cam into the first axial position.

10. A mechanism as claimed in claim 9 wherein the third biasing means comprises a spring disposed axially around the hinge pin between the hinge plate and the upper gate.

11. A mechanism for righting a tipped package on a conveyor line comprising:

a) a gate;

b) detecting means for detecting when the tipped package has been righted; and c) holding means for holding the gate in a closed position to contact and right the tipped package as the package is moved along the conveyor line until the detecting means detects that the package has been righted.

12. A mechanism as claimed in claim 11 wherein the detecting means comprises a further gate disposed with respect to the conveyor line and the gate so that the tipped package will operate the further gate when it is substantially righted.

13. A mechanism as claimed in claim 11 wherein the detecting means comprises an electronic sensor.

14. A mechanism as claimed in claim 13 wherein the electronic sensor comprises:

a) an infrared emitter disposed on a first side of the conveyor;

b) an infrared detector disposed on a second side of the conveyor opposite the first side, the infrared detector having an output indicative of reception of an infrared signal emitted from the infrared emitter circuit, the infrared emitter and detector being positioned with respect to the conveyor line and the gate so that the tipped package will disrupt reception of the infrared signal when the tipped package is substantially righted; and c) an actuating circuit connected to receive the output of the infrared detector, the actuating circuit having an output.

15. The mechanism of claim 11 wherein the holding means comprises a mechanical linkage between the detecting means and the gate.

\* \* \* \* \*

UNITED STATES PATENT AND TRADEMARK OFFICE
CERTIFICATE OF CORRECTION

PATENT NO.   : 5,531,310
ISSUED       : July 2, 1996
INVENTOR(S)  : Kosaku Itoh

It is certified that errors appear in the above-identified patent and that said Letters Patent is hereby corrected as shown below:

IN COLUMN 2, LINE 6

Cancel "preventing" and insert --righting-- therefor.

IN COLUMN 6, LINE 11

Cancel "righting" and insert --preventing-- therefor.

Signed and Sealed this

Twenty-fourth Day of September, 1996

Attest:

BRUCE LEHMAN

Attesting Officer

Commissioner of Patents and Trademarks